UNITED STATES PATENT OFFICE.

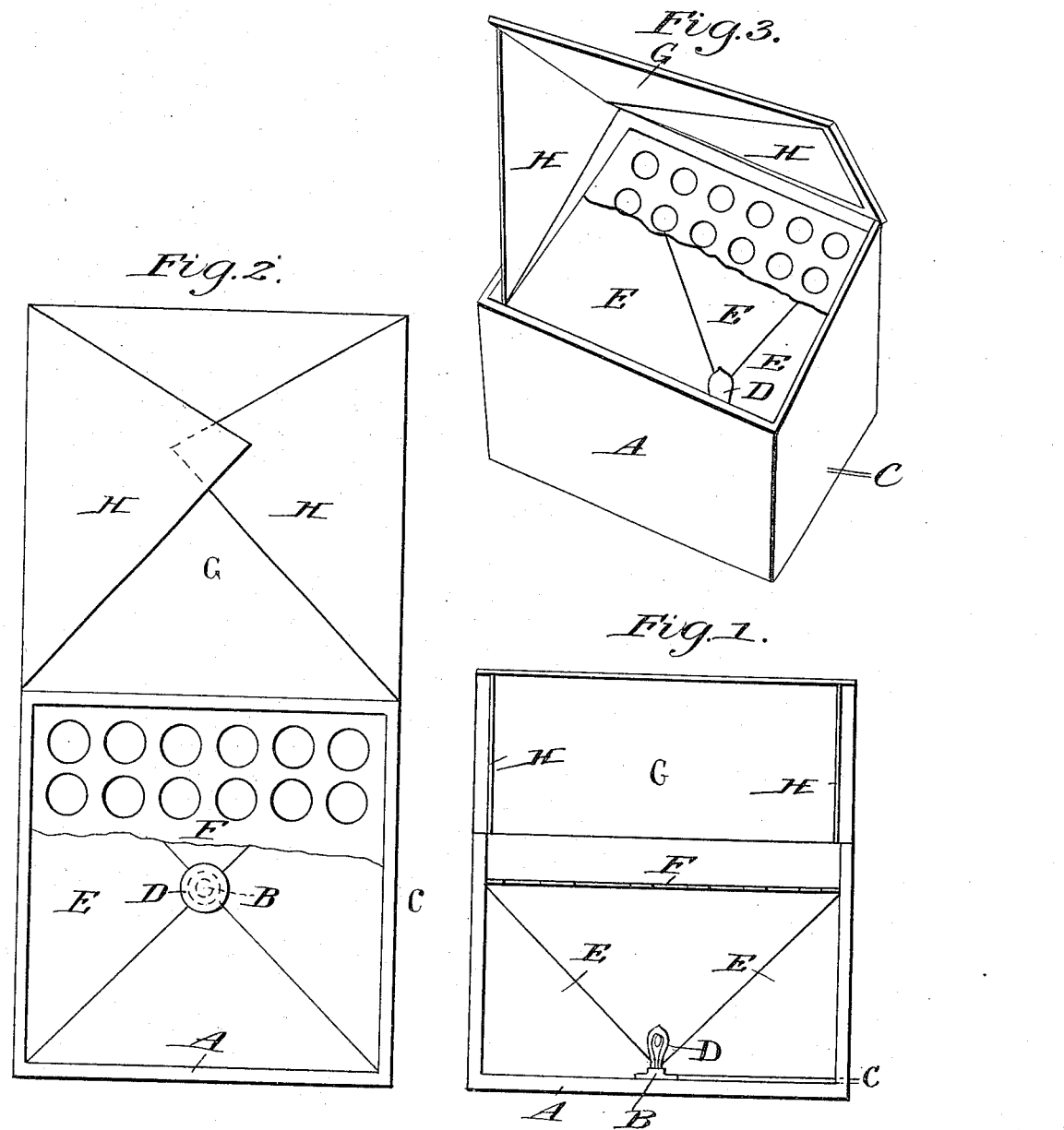

THOMAS McLAUGHLIN, OF SAGINAW, MICHIGAN, ASSIGNOR TO GEORGE V. CARROLL, OF CHICAGO, ILLINOIS.

EGG-TESTING DEVICE.

1,146,434.   Specification of Letters Patent.   Patented July 13, 1915.

Application filed April 28, 1913, Serial No. 764,217. Renewed December 14, 1914. Serial No. 877,280.

*To all whom it may concern:*

Be it known that I, THOMAS McLAUGHLIN, a citizen of the United States, residing at Saginaw, in the county of Saginaw and State of Michigan, have invented a new and useful Egg-Testing Device, of which the following is a specification.

My invention relates to improvements in egg testers in which an egg is interposed between a light and the eye of the operator, surrounded by a screen of convenient shape to shut off light except such as passes through the egg; and the object of my invention is to provide means for testing a number of eggs at once, to increase the speed at which this work may be done and simplifies the handling of the eggs. I attain these objects by the mechanism illustrated in the accompanying drawings, in which—

Figure 1, is a vertical section through the device; Fig. 2, is a top plan view of the machine and Fig. 3, is a perspective of the machine.

Similar letters refer to similar parts throughout the several views.

The body of the machine A. incloses a hopper shaped reflector E. in which is mounted an electric light D. attached to a socket B. connected to an extension cord C. which passes out of the machine at one end to attach to the source of current. Mounted at the top of the reflector is a translucent tray F. perforated with a number of holes to receive eggs on end. The cover of the machine G. has wings hinged to its under side to form the ends of a shed like cover, when raised, serving to exclude light coming to the eye of the operator except that coming through the eggs in the tray.

In use the extension cord is attached to any convenient source of current, the cover raised and supported on the extended wings resting at the inside of the ends of the box; the holes in the tray filled with eggs and the light turned on; the light reflected by the hopper shaped reflector is stopped at all points except through the eggs by the opaque material of the tray and the light coming through the eggs reveals their hidden mysteries to the operator—the tested eggs are then removed, and the operation repeated as often as desired.

I have shown but one arrangement of lighting the machine, electric light, but it may be lighted by any other source of light with suitable arrangements for its distribution, with equal effect.

What I claim as my invention and desire to secure by Letters Patent is;

1. In an egg tester, a combination of a light with a hopper shaped reflector, inclosed in a box and covered by an opaque tray having a series of orifices adapted to hold an egg on end in each hole, the whole device being shaded from outside light by a cover having wings at each end of its lower side adapted to fold outwardly and engage the inner side of each end of the box, the light from below showing through the eggs in the rack revealing the internal condition of each egg at a glance.

2. In an egg tester, an opaque egg tray having a multiplicity of perforations for holding eggs, supported at the top of a hopper shaped reflector arranged to be illuminated by artificial light; the whole inclosed and supported by a box to exclude outside light, and covered by a cover having wings closing out external light except at the side occupied by the operator.

In testimony whereof I have set my hand to these specifications in the presence of two subscribing witnesses.

THOS. McLAUGHLIN.

Witnesses:
W. F. PAINE,
M. S. PAINE.

Copies of this patent may be obtained for five cents each, by addressing the "Commissioner of Patents, Washington, D. C."